United States Patent Office 2,992,228
Patented July 11, 1961

2,992,228
HALOGEN SUBSTITUTED ALKENYL BENZO-THIAZOLESULFENAMIDES
John J. D'Amico, Charleston, W. Va., assignor to Monsanto Chemical Company, St. Louis, Mo., a corporation of Delaware
No Drawing. Filed Aug. 7, 1959, Ser. No. 832,156
11 Claims. (Cl. 260—306.6)

The present invention relates to a new class of sulfenamide products and also to the use of such products as accelerators of the vulcanization of rubber. The products of the invention most readily are prepared by the oxidation of a haloalkenyl amine salt of a benzothiazyl compound as will be described by several typical examples of the class. The various products most conveniently may be represented by the general formula

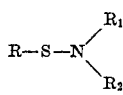

wherein R represents a 2-benzothiazole grouping or substituted derivative, $R_1$ represents lower alkenyl substituted on doubly bonded carbon by at least one middle halogen i.e. chlorine or bromine group and $R_2$ represents hydrogen but preferably an alkyl, allyl or an alicyclic group.

As examples of the benzothiazole grouping there are included within the invention 2-mercaptobenzothiazole and its ring substitution products, such as the chlor, alkoxy, alkyl, nitro and phenyl derivatives. As haloalkenyl amines also employed as reactants there are included many compounds such as N-(2-chloroallyl)cyclohexylamine, N-(3-chloro-2-butenyl)cyclohexylamine, 2-chloro-N-methyl allylamine, 2-bromo-N-ethyl allylamine, 2-chloro-N-isopropyl allylamine, 2-bromo-N-isopropyl allylamine, isobutyl N-(2-bromoallyl)amine, isoamyl N-(2-bromoallyl)amine, N-(2-bromoallyl)-3,5,5-trimethyl hexylamine, 2,3-dichloro-N-isopropyl allylamine, 2,3,3-trichloro-N-isopropyl allylamine, 2,3-dibromo-N-isopropyl allylamine, N-(2,3-dichloro-2-butenyl)isopropylamine, 2-chloro-N-allyl allylamine, 2,3-dichloro-N-allyl allylamine, 3-chloro-2-butenylamine and the like.

The invention will be readily understood from the following examples of a preferred method of preparing some of the typical products within the class named.

EXAMPLE 1—PRODUCT A

*N - (3 - chloro - 2 - butenyl) - N - cyclohexyl - 2 - benzothiazolesulfenamide*

A solution of the sodium salt of 2-mercaptobenzothiazole was prepared by dissolving 43 parts (0.25 mole) of the said thiazole of 97% purity, in 50 parts of water containing 40 parts (0.25 mole) of 25% sodium hydroxide solution. Thereupon, 187.7 parts (1.0 mole) of N-(3-chloro-2-butenyl)cyclohexylamine were slowly added and the mixture stirred for a short period of time to insure complete mixing. Then 59 parts of 25% sulfuric acid were slowly added with continued agitation, following which 22.32 parts (0.3 mole) of aqueous sodium hypochlorite were aided over a period of time, for example about two hours, while maintaining the temperature of the entire mass at between 25–30° C. Stirring was continued after the addition of all the hypochlorite for about an hour and then a small quantity (for example 2 parts) of sodium sulfite was added to remove any excess of unreacted hypochlorite. The reaction mixture was then extracted with ether and filtered to remove disulfide impurities. The ethereal solution was then washed with ater until the washings were neutral in reaction to litmus, the extract was dried over anhydrous sodium sulfate, and the ether was then removed in vacuo at a maximum temperature of 30° C. The product, obtained in 74% yield, was an amber colored oil, soluble in ether, acetone, benzene, heptane, chloroform, ethanol and ethyl acetate. The product as named in line 1 of this example, having the formula $C_{17}H_{21}ClN_2S_2$, was confirmed as to structure by analysis as is evident from the following results:

|  | Percent Theory | Percent Found |
|---|---|---|
| Nitrogen | 7.94 | 7.93 |
| Sulfur | 18.17 | 18.31 |

EXAMPLE 2—PRODUCT B

*N - (3 - chloro - 2 - butenyl) - N - cyclohexyl - 6 - ethoxy-2-benzothiazolesulfenamide*

Again proceeding as described in Example 1, with the exception that 58 parts (0.25 mole) of 90% 6-ethoxy-2-mercaptobenzothiazole were employed in place of 2-mercaptobenzothiazole, there was obtained in 90% yield an amber colored oily product displaying the same solubility properties as the product of Example 1. The expected product, of formula $C_{19}H_{25}ClN_2OS_2$, was confirmed by analysis as before, with the results:

|  | Percent Theory | Percent Found |
|---|---|---|
| Nitrogen | 7.06 | 6.88 |

EXAMPLE 3—PRODUCT C

*5 - chloro - N - (2 - chloroallyl) - N - (3 - methoxypropyl)-2-benzothiazolesulfenamide*

As another example of the invention, a solution was prepared comprising 50.4 parts (0.25 mole) of 5-chloromercaptobenzothiazole in 25 parts of water containing 40 parts (0.25 mole) of 25% sodium hydroxide solution. Thereupon, 204 parts (1.25 moles) of 2-chloro-N-(3-methoxy propyl)allylamine were slowly added over a period of time, while agitating continuously, and then 59 parts of 25% sulfuric acid slowly added and agitation continued for a short time after all the acid had been added. Following this 22.32 parts (0.3 mole) of sodium hypochlorite were added as a water solution thereof. This last addition was also slowly done over about a two hour period while holding the temperature of the mass between 45–50° C. Agitation was continued under the temperature limits mentioned for about an hour after all the hypochlorite had been added. After this a small quantity of sodium sulfite (for example 4 parts) were added while stirring to destroy any residual oxidizing agent present. The entire mass was then cooled to below 25° C. and was ether extracted, and then filtered to remove the small quantity of disulfide present. The ether solution was then washed with water until the washings were neutral to litmus, the extract was then dried by treatment with anhydrous sodium sulfate, and the ether was then removed in vacuo. The yield obtained was 43%. The product of the reaction remained as an amber colored oily liquid and was identified as the product named at the start of this example ($C_{14}H_{16}Cl_2N_2OS_2$) by analysis, which yielded as results:

|  | Percent Theory | Percent Found |
|---|---|---|
| Nitrogen | 7.71 | 7.53 |
| Chlorine | 19.52 | 19.62 |

The product exhibited the same characteristics to various solvents as did the products of Examples 1 and 2.

EXAMPLE 4—PRODUCT D

5 - chloro - N - (2 - chloroallyl) - N - isopropyl - 2 - benzothiazolesulfenamide As another example of the reaction, the procedure described in detail in Example 3 was followed with the sole exception that 167 parts (1.25 moles) of 2-chloro-N-(isopropyl allylamine) were used as the chloroalkenyl amine. The product obtained was an amber colored viscous oil, again showing the same behavior in solvents as the product of Example 1. The compound named as the expected product at the start of this example was confirmed as to formula $(C_{13}H_{14}Cl_2N_2S_2)$ by the following analysis:

|  | Percent Theory | Percent Found |
|---|---|---|
| Nitrogen | 8.41 | 8.25 |

As examples of the vulcanization accelerating properties in rubber compounds of the sulfenamides containing haloalkenyl amino nuclei, the following results are set forth as typical for the new class of products described herein. Rubber compounds were prepared in the well known manner according to the following recipes and the various stocks shown were vulcanized in a press for the indicated times at a temperature of 144° C.

| Stock | A | B | C | D |
|---|---|---|---|---|
|  | Parts by weight ||||
| Smoked sheets rubber | 100 | 100 | 100 | 100 |
| Carbon black (Philblack O) | 50 | 50 | 50 | 50 |
| Zinc oxide | 5 | 5 | 5 | 5 |
| Stearic acid | 2 | 2 | 3 | 3 |
| Saturated hydrocarbon softener | 3 | 3 | 3 | 3 |
| Sulfur | 2.5 | 2.5 | 2.5 | 2.5 |
| Product A | 0.5 |  |  |  |
| Product B |  | 0.5 |  |  |
| Product C |  |  | 0.5 |  |
| Product D |  |  |  | 0.5 |

TABLE I

| Stock | Cure Time in Mins. | Modulus of Elasticity in lbs./in.² at Elongation of 300% | Tensile at Break in lbs./in.² | Ultimate Elongation, percent |
|---|---|---|---|---|
| A | 30 | 1,905 | 3,405 | 480 |
|   | 45 | 1,936 | 3,540 | 480 |
|   | 60 | 2,126 | 3,470 | 460 |
| B | 30 | 1,580 | 3,123 | 470 |
|   | 45 | 1,753 | 3,150 | 450 |
|   | 60 | 1,700 | 2,870 | 433 |
| C | 20 | 1,110 | 2,700 | 540 |
|   | 45 | 1,760 | 3,100 | 470 |
|   | 60 | 1,790 | 2,900 | 440 |
| D | 20 | 530 | 1,520 | 570 |
|   | 45 | 1,250 | 2,580 | 480 |
|   | 60 | 1,500 | 2,600 | 460 |

The scorch delay of the uncured compositions was evaluated by means of a Mooney plastometer. The time required for incipient vulcanization or scorch was taken at the point on the plasticity curve when the plasticity began to rise continuously:

TABLE II

| Stock | Mooney Scorch in Mins. at 121° C. |
|---|---|
| A | 22 |
| B | 29 |
| C | 33.3 |
| D | 77.2 |

EXAMPLE 5—PRODUCT E 2-chloroallyl-2-benzothiazolesulfenamide

Into a reactor was charged 43 parts by weight (0.25 mole) of 97% mercaptobenzothiazole, 114 parts (1.0 mole) of 2-chloroallyl amine hydrochloride, 190 parts (1.25 mole) of 25% sodium hydroxide and 25 parts water. The charge was stirred for about 15 minutes and then to it was added 49.5 parts of 25% sulfuric acid gradually while keeping the temperature of the reaction mixture at 25–30° C. The addition was made in about 15 minutes. After stirring for about 15 minutes longer, an aqueous solution containing 22.4 parts of sodium hypochlorite was added over a period of 90 minutes, keeping the temperature of the reaction mixture at 45–50° C. The reaction mixture was stirred at 45–50° C. for an additional hour, cooled to 25° C. and 4 parts of sodium sulfite added. The reaction mixture was extracted with ethyl ether, the ether solution washed with water until the washings were neutral to litmus and dried over sodium sulfate. The ether was removed in vacuo at a maximum temperature of 30° C. The desired product was obtained in 96% yield as a dark amber colored viscous oil. It contained 10.79% nitrogen as compared to 10.87% nitrogen calculated for $C_{10}H_9ClN_2S_2$.

EXAMPLE 6—PRODUCT F

N-(3,3-dichloroallyl)-N-cyclohexyl-2-benzothiazolesulfenamide

Into a reactor was charged 43 parts by weight of 97% mercaptobenzothiazole and 40 parts of 25% sodium hydroxide. The mixture was stirred while to it was added 208.1 parts of 3,3-dichloro-N-cyclohexyl allyl amine. There was then added 59 parts of 25% sulfuric acid and stirring continued for 15 minutes. This was followed by the addition of an aqueous solution containing 22.6 parts of sodium hypochlorite. The addition of the hypochlorite was made over a period of 90 minutes while keeping the reaction mixture at 45–50° C. The stirred reaction mixture was held at this temperature for one hour longer. After cooling to 25° C., 4 parts of sodium sulfite were added and stirring continued for 5 minutes. The reaction mixture was extracted with ethyl ether and the ether solution filtered to remove a small amount of insoluble material. The ether solution was washed with dilute hydrochloric acid and then with water until neutral to litmus. After drying over sodium sulfate the ether was removed in vacuo at a maximum temperature of 30° C. The desired product was obtained as a viscous oil which solidified on standing. The product, a low melting solid, was obtained in 53.5% yield. It contained 7.1% nitrogen as compared to 7.5% nitrogen calculated for

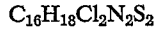

$$C_{16}H_{18}Cl_2N_2S_2$$

Products E and F were employed as the accelerator in a composition comprising:

| | |
|---|---|
| Smoked sheets | 100 |
| Carbon black | 50 |
| Zinc oxide | 5 |
| Stearic acid | 3 |
| Saturated hydrocarbon softener | 3 |
| Sulfur | 2.5 |
| Antioxidant | 1.5 |
| Accelerator | 0.5 |

The stock containing Product E developed an ultimate tensile strength of 3160 pounds per square inch at optimum cure after curing at 144° C. The stock containing Product F developed an ultimate tensile strength of 2780 pounds per square inch at optimum cure under the same conditions. The vulcanizable composition possessed more processing safety than a similar stock containing a commercial sulfenamide accelerator employed as the control.

It is intended to cover all changes and modifications of the examples of the invention herein chosen for purposes of disclosure which do not constitute departures from the spirit and scope of the invention. This application is a continuation-in-part of Serial No. 623,518, filed November 21, 1956, now abandoned.

What is claimed is:
1. As a new compound N-(3-chloro-2-butenyl)-N-cycloxehyl-2-benzothiazolesulfenamide.
2. As a new compound N-(3-chloro-2-butenyl)-N-cyclohexyl-6-ethoxy-2-benzothiazolesulfenamide.
3. As a new compound 5-chloro-N-(2-chloroallyl)-N-(3-methoxypropyl)-2-benzothiazolesulfenamide.
4. As a new compound 5-chloro-N-(2-chloroallyl)-N-isopropyl-2-benzothiazolesulfenamide.
5. As a new compound 2-chloroallyl-2-benzothiazolesulfenamide.
6. As a new compound N-(3,3-dichloroallyl)-N-cyclohexyl-2-benzothiazolesulfenamide.
7. A sulfenamide of the formula

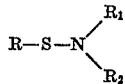

wherein R is a member of the group consisting of benzothiazolyl and monochloro, monoloweralkyl, monoloweralkoxy, mononitro and monophenylbenzthiazolyl, $R_1$ is lower alkenyl substituted on an unsaturated carbon thereof by at least one middle halogen, and $R_2$ is a member of the group consisting of H, alkyl of 1–9 carbon atoms inclusive, loweralkoxy-loweralkyl and cyclohexyl.

8. A sulfenamide of the formula

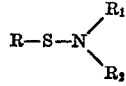

wherein R is 6-loweralkoxybenzothiazolyl, $R_1$ is loweralkenyl substituted on an unsaturated carbon thereof by at least one chlorine and $R_2$ is cyclohexyl.

9. A sulfenamide of the formula

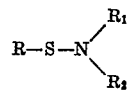

wherein R is a 5-chlorobenzothiazolyl, $R_1$ is loweralkenyl substituted on an unsaturated carbon thereof by at least one chlorine and $R_2$ is loweralkoxy-loweralkyl.

10. A sulfenamide of the formula

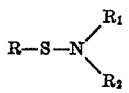

wherein R is benzothiazolyl, $R_1$ is loweralkenyl substituted on an unsaturated carbon thereof by at least one chlorine and $R_2$ is alkyl of 1–9 carbon atoms inclusive.

11. A sulfenamide of the formula

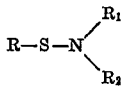

wherein R is benzothiazolyl, $R_1$ is loweralkenyl substituted on an unsaturated carbon thereof by at least one chlorine and $R_2$ is cyclohexyl.

No references cited.